(12) United States Patent
Chang

(10) Patent No.: US 11,732,122 B2
(45) Date of Patent: Aug. 22, 2023

(54) MODIFIED POLYVINYL BUTYRAL MATERIAL, AND PREPARATION AND APPLICATIONS THEREOF

(71) Applicant: An-Hsiung Chang, Taichung (TW)

(72) Inventor: An-Hsiung Chang, Taichung (TW)

( * ) Notice: Subject to any disclaimer, the term of this patent is extended or adjusted under 35 U.S.C. 154(b) by 0 days.

(21) Appl. No.: 17/951,515

(22) Filed: Sep. 23, 2022

(65) Prior Publication Data
US 2023/0032394 A1 Feb. 2, 2023

Related U.S. Application Data

(62) Division of application No. 17/019,398, filed on Sep. 14, 2020, now Pat. No. 11,639,437.

(51) Int. Cl.
| | |
|---|---|
| *C08L 29/14* | (2006.01) |
| *C08J 3/18* | (2006.01) |
| *C08J 3/26* | (2006.01) |
| *C08K 5/11* | (2006.01) |
| *C08K 5/29* | (2006.01) |
| *D06N 3/04* | (2006.01) |
| *D06N 3/14* | (2006.01) |
| *B32B 7/12* | (2006.01) |
| *B32B 27/20* | (2006.01) |
| *B32B 27/22* | (2006.01) |
| *B32B 27/08* | (2006.01) |
| *B32B 5/20* | (2006.01) |
| *B32B 27/12* | (2006.01) |
| *B32B 27/26* | (2006.01) |
| *C08K 3/26* | (2006.01) |
| *C08K 3/34* | (2006.01) |
| *B32B 27/30* | (2006.01) |
| *B32B 5/02* | (2006.01) |
| *C08K 5/00* | (2006.01) |
| *C08K 5/098* | (2006.01) |
| *C08L 83/04* | (2006.01) |

(52) U.S. Cl.
CPC ........... *C08L 29/14* (2013.01); *B32B 5/028* (2013.01); *B32B 7/12* (2013.01); *B32B 27/20* (2013.01); *B32B 27/22* (2013.01); *B32B 27/306* (2013.01); *C08J 3/18* (2013.01); *C08K 3/26* (2013.01); *C08K 3/34* (2013.01); *C08K 5/005* (2013.01); *C08K 5/098* (2013.01); *C08K 5/11* (2013.01); *C08K 5/29* (2013.01); *C08J 2329/14* (2013.01); *C08K 2003/265* (2013.01); *C08L 83/04* (2013.01)

(58) Field of Classification Search
None
See application file for complete search history.

(56) References Cited

U.S. PATENT DOCUMENTS

| | | | | |
|---|---|---|---|---|
| 2005/0249911 | A1* | 11/2005 | Randall | .............. B32B 27/30 |
| | | | | 428/95 |
| 2009/0297794 | A1 | 12/2009 | Lin | |
| 2016/0001530 | A1* | 1/2016 | Uto | .................. B32B 27/20 |
| | | | | 428/423.1 |
| 2019/0127554 | A1 | 5/2019 | Laufer | |

FOREIGN PATENT DOCUMENTS

| | | |
|---|---|---|
| CN | 101845186 | 9/2010 |
| CN | 102863917 | 1/2013 |
| CN | 105400110 | 3/2016 |
| CN | 111423680 | 7/2020 |
| CN | 114058144 | 2/2022 |
| EP | 3156222 | 4/2017 |
| WO | WO2020193563 | 10/2020 |

OTHER PUBLICATIONS

Cheng Jun and Zhang Lihong, Mineral Geology of China—vol. Chongqing, Jul. 2019, ISBN 978-7-116-11526-2, published by Geological Press, Beijing, China.

Ma Jianzhong, Qing Ning and Lu Shenghua, Leather Chemicals Ed 2, Mar. 2008, ISBN 978-7-122-01993-6, published by Chemical Industry Press, Beijing, China.

* cited by examiner

*Primary Examiner* — Sheeba Ahmed
(74) *Attorney, Agent, or Firm* — WPAT, P.C

(57) ABSTRACT

The present invention relates to a modified polyvinyl butyral material, comprising a polyvinyl butyral composite material, a filler, an anti-hydrolysis agent, a first plasticizer, zinc stearate, calcium stearate, and a polymeric dispersant; wherein the polyvinyl butyral composite material is obtained by plasticizing a composition comprising polyvinyl butyral and a second plasticizer. The present invention also relates to a preparation method of the modified polyvinyl butyral material, a modified polyvinyl butyral product comprising at least one modified polyvinyl butyral layer prepared from a material comprising the modified polyvinyl butyral material, and the preparation method of the modified polyvinyl butyral product.

18 Claims, 10 Drawing Sheets

MODIFIED POLYVINYL BUTYRAL MATERIAL, AND PREPARATION AND APPLICATIONS THEREOF

CROSS-REFERENCE TO RELATED APPLICATION

This application is a divisional application of Non-provisional patent application Ser. No. 17/019,398, filed on Sep. 14, 2020, the disclosure of which is incorporated herein by reference.

BACKGROUND OF THE INVENTION

1. Field of the Invention

The present invention relates to a modified polyvinyl butyral material and the preparation method thereof; also relates to a modified polyvinyl butyral product comprising at least one modified polyvinyl butyral layer prepared from a material comprising the modified polyvinyl butyral material, and the preparation method of the modified polyvinyl butyral product.

2. Description of the Prior Arts

In the production of safety glass, windscreen glass or plate glass, the glass is combined with a thermoplastic polyvinyl butyral (PVB) material, such as inserting a laminating film made of the PVB material between glass panes. The production of the above-mentioned glass and PVB laminating films often creates PVB leftover materials. If the PVB leftover materials are thrown away directly, they not only impact the environment but also result in the waste of PVB materials. However, these PVB materials have high water absorbency and viscosity and cannot be easily subjected to other processing treatments, so they cannot be applied to other daily necessities.

Conventionally, when the PVB material-comprising products are produced, a layer made of the PVB material is prepared by calendaring. The calendaring process needs multiple independent equipment, and the process is segmented into several parts. Therefore, it needs a higher equipment cost, a larger space, more manpower and a greater energy consumption. In addition, since the calendaring machine is an open system and the plasticizer is heated and evaporated during the manufacturing process, unnecessary air pollution is caused. Therefore, the relevant manufacturing process also needs to be improved.

SUMMARY OF THE INVENTION

The polyvinyl butyral materials known in the art have higher water absorbency and viscosity, and cannot be easily recycled. Therefore, the present invention provides a modified polyvinyl butyral material, which is obtained by modifying a polyvinyl butyral composite material at a high temperature, and the resulting modified polyvinyl butyral material has a better water resistance and anti-sticking property. Additionally, the disadvantages of the conventional calendaring process are also improved. In the present invention, a modified polyvinyl butyral (PVB) layer is obtained by casting a material comprising the above-mentioned modified polyvinyl butyral material, so the production line can be optimized and the costs can be reduced. The modified polyvinyl butyral layer can be used alone, or in combination with a variety of base layers to obtain varied modified polyvinyl butyral products.

One purpose of the present invention is to provide a modified polyvinyl butyral material, comprising a polyvinyl butyral composite material, a filler, an anti-hydrolysis agent, a first plasticizer, zinc stearate, calcium stearate and a polymeric dispersant; wherein the polyvinyl butyral composite material is obtained by plasticizing a composition comprising polyvinyl butyral and a second plasticizer.

According to the present invention, the above-mentioned modified polyvinyl butyral material exhibits a better water resistance. For example, in some embodiments of the present invention, the modified polyvinyl butyral material absorbs water in an amount of 8 percent by weight (wt %) or less, 7.5 wt % or less, or 7 wt % or less after placed in water at room temperature for three days.

According to the present invention, the above-mentioned modified polyvinyl butyral material exhibits a better anti-sticking property. For example, in some embodiments of the present invention, when two modified polyvinyl butyral material films made from the modified polyvinyl butyral material are overlapped, applied with a force of 3 kilograms (kg) thereon and heated at 70° C. for 120 hours, the two films are not stuck to each other. In some embodiments of the present invention, when two modified polyvinyl butyral material films made from the modified polyvinyl butyral material are overlapped, applied with a force of 3 kg thereon and heated at 70° C. for 180 hours, the two films are not stuck to each other.

In some embodiments of the present invention, the modified polyvinyl butyral material comprises components at the following ratio: the filler is in an amount of 10 parts by weight to 165 parts by weight, the anti-hydrolysis agent is in an amount of 0.3 parts by weight to 2.5 parts by weight, the first plasticizer is in an amount of 2.5 parts by weight to 20 parts by weight, zinc stearate is in an amount of 1.5 parts by weight to 5 parts by weight, calcium stearate is in an amount of 0.1 parts by weight to 1.5 parts by weight, and the polymeric dispersant is in an amount of 0.001 parts by weight to 0.010 parts by weight, based on 100 parts by weight of the total weight of the polyvinyl butyral composite material; and, in the polyvinyl butyral composite material, the second plasticizer is in an amount of 3 parts by weight to 15 parts by weight based on 100 parts by weight of the total weight of the polyvinyl butyral composite material.

In some embodiments of the present invention, the filler comprises calcium carbonate, a crystalline aluminosilicate, or a combination thereof. In some embodiments of the present invention, the crystalline aluminosilicate comprises kaolin, a commercial product named as "anhydrous transparent powder", or a combination thereof. The anhydrous transparent powder has a median particle diameter of 1.92 micrometers (μm) to 30.5 μm, a dibutyl phthalate (DBP) absorption number of 12 to 25, and a pH value of 7.0. In some embodiments of the present invention, the filler is in an amount of 10 parts by weight to 165 parts by weight, or 15 parts by weight to 160 parts by weight, or 20 parts by weight to 120 parts by weight, or 30 parts by weight to 100 parts by weight, or 50 parts by weight to 80 parts by weight, based on 100 parts by weight of the total weight of the polyvinyl butyral composite material. In some embodiments of the present invention, the filler is a combination of calcium carbonate and a crystalline aluminosilicate, wherein, based on 100 parts by weight of the total weight of the polyvinyl butyral composite material, calcium carbonate is in an amount of 5 parts by weight to 160 parts by weight, or 6 parts by weight to 150 parts by weight, or 10 parts by weight to 120 parts by weight, or 30 parts by weight to 100 parts by weight, or 50 parts by weight to 80 parts by weight; and the crystalline aluminosilicate is in an amount of 3 parts by weight to 15 parts by weight, or 5 parts by weight to 13 parts by weight, or 7 parts by weight to 12 parts by weight, or 9 parts by weight to 11 parts by weight. In some embodiments of the present invention, the amount of the crystalline aluminosilicate will influence the water absorption of the polyvinyl butyral composite material. When 12.5 parts by weight of a crystalline aluminosilicate is added, the water absorption of the polyvinyl butyral composite material is about 3%.

In some embodiments of the present invention, the anti-hydrolysis agent comprises a carbodiimide type anti-hydrolysis agent. In some embodiments of the present invention, the carbodiimide type anti-hydrolysis agent comprises carbodiimide, bis(2,6-diisopropylphenyl)carbodiimide, polycarbodiimides, or a combination thereof. In some embodiments of the present invention, the anti-hydrolysis agent is in an amount of 0.3 parts by weight to 2.5 parts by weight, or 0.5 parts by weight to 2 parts by weight, or 1 part by weight to 1.5 parts by weight, based on 100 parts by weight of the total weight of the polyvinyl butyral composite material.

In some embodiments of the present invention, the first plasticizer and second plasticizer independently comprise a bis(2-ethylhexanoate) type plasticizer, a phthalate type plasticizer, an adipate type plasticizer, or a combination thereof. In some embodiments of the present invention, the bis(2-ethylhexanoate) type plasticizer comprises triethylene glycol bis(2-ethylhexanoate). In some embodiments of the present invention, the phthalate type plasticizer comprises di(2-propylheptyl) phthalate (DPHP). In some embodiments of the present invention, the adipate type plasticizer comprises GLOBINEX W-2370. In some embodiments of the present invention, the first plasticizer is in an amount of 2.5 parts by weight to 20 parts by weight, or 3 parts by weight to 18 parts by weight, or 5 parts by weight to 15 parts by weight, or 7 parts by weight to 10 parts by weight, based on 100 parts by weight of the total weight of the polyvinyl butyral composite material. In some embodiments of the present invention, the second plasticizer is in an amount of 3 parts by weight to 15 parts by weight, or 5 parts by weight to 12 parts by weight, or 7 parts by weight to 10 parts by weight, based on 100 parts by weight of the total weight of the polyvinyl butyral composite material.

In some embodiments of the present invention, zinc stearate and calcium stearate are used as a lubricant. In some embodiments of the present invention, zinc stearate is in an amount of 1.5 parts by weight to 5 parts by weight, or 2 parts by weight to 4 parts by weight, or 2.5 parts by weight to 3.6 parts by weight, or 2.8 parts by weight to 3.2 parts by weight, based on 100 parts by weight of the total weight of the polyvinyl butyral composite material. In some embodiments of the present invention, calcium stearate is in an amount of 0.1 parts by weight to 1.5 parts by weight, or 0.2 parts by weight to 1.2 parts by weight, or 0.4 parts by weight to 1 part by weight, or 0.5 parts by weight to 0.7 parts by weight, based on 100 parts by weight of the total weight of the polyvinyl butyral composite material. In some embodiments of the present invention, the lubricants, zinc stearate and calcium stearate, are used at the above-mentioned ratios as a combination to give a better operability, in which the materials would not stick onto the machines during the preparation process.

In some embodiments of the present invention, the polymeric dispersant comprises a polysiloxane, a high melting-point wax, or a combination thereof. In some embodiments of the present invention, the polysiloxane comprises a silicone oil, a hydrogen silicone oil, methylhydrogensiloxane, or a combination thereof. In some embodiments of the present invention, the silicone oil comprises polydimethylsiloxane. In some embodiments of the present invention, the high melting-point wax comprises a stearamide, such as stearamide, ethylene bis(stearamide), or a combination thereof. In some embodiments of the present invention, the polymeric dispersant is in an amount of 0.001 parts by weight to 0.010 parts by weight, or 0.002 parts by weight to 0.007 parts by weight, or 0.003 parts by weight to 0.005 parts by weight, based on 100 parts by weight of the total weight of the polyvinyl butyral composite material. The addition of the polymeric dispersant makes the modified polyvinyl butyral material more wear resistant.

In some embodiments of the present invention, the modified polyvinyl butyral material can further comprise a cold-resistant agent. In some embodiments of the present invention, the cold-resistant agent comprises an adipate type cold-resistant agent. In some embodiments of the present invention, the adipate type cold-resistant agent comprises dioctyl adipate, diisononyl adipate, or a combination thereof. In some embodiments of the present invention, the cold-resistant agent is in an amount of 1.5 parts by weight to 10 parts by weight, or 2 parts by weight to 8 parts by weight, or 4 parts by weight to 6 parts by weight, based on 100 parts by weight of the total weight of the polyvinyl butyral composite material.

In some embodiments of the present invention, the modified polyvinyl butyral material can further comprise an anti-oxidant. In some embodiments of the present invention, the anti-oxidant comprises a pentaerythritol ester type anti-oxidant, a phosphite type anti-oxidant, a hexamethylenediamine type anti-oxidant, or a combination thereof. In some embodiments of the present invention, the pentaerythritol ester type anti-oxidant comprises pentaerythritol tetrakis(3-(3,5-di-t-butyl-4-hydroxyphenyl) propionate) (also known as the anti-oxidant 1010). In some embodiments of the present invention, the phosphite type anti-oxidant comprises tris-(2,4-di-t-butylphenyl)phosphite (also known as the anti-oxidant 168). In some embodiments of the present invention, the hexamethylenediamine type anti-oxidant comprises N,N'-bis(3,5-di-t-butyl -4-hydroxyphenylpropionyl)-hexamethylenediamine (also known as the anti-oxidant 1098). In some embodiments of the present invention, the anti-oxidant is in an amount of 0.5 parts by weight to 2.5 parts by weight, or 1 part by weight to 2 parts by weight, or 1.5 parts by weight to 1.8 parts by weight, based on 100 parts by weight of the total weight of the polyvinyl butyral composite material.

In some embodiments of the present invention, the modified polyvinyl butyral material can further comprise an anti-ultraviolet agent. In some embodiments of the present invention, the anti-ultraviolet agent comprises a benzotriazole type anti-ultraviolet agent, a benzophenone type anti-ultraviolet agent, or a combination thereof. In some embodiments of the present invention, the benzotriazole type anti-ultraviolet agent comprises octrizole (also known as the anti-ultraviolet agent 329). In some embodiments of the present invention, the benzophenone type anti-ultraviolet agent comprises 2-hydroxy-4-n-octoxy -benzophenone (also known as the anti-ultraviolet agent 531). In some embodiments of the present invention, the anti-ultraviolet agent is in an amount of 0.1 parts by weight to 1.5 parts by weight, or 0.3 parts by weight to 1 part by weight, or 0.5 parts by weight to 0.75 parts by weight, based on 100 parts by weight of the total weight of the polyvinyl butyral composite material. The addition of the anti-ultraviolet agent can enhance the weather resistance of the modified polyvinyl butyral material.

In some embodiments of the present invention, the modified polyvinyl butyral material can further comprise a coloring agent. In some embodiments of the present invention, the coloring agent is in an amount of 0.5 parts by weight to 35 parts by weight, or 1 part by weight to 30 parts by weight, or 5 parts by weight to 20 parts by weight, or 10 parts by weight to 16 parts by weight, based on 100 parts by weight of the total weight of the polyvinyl butyral composite material. In some embodiments of the present invention, the coloring agent comprises an inorganic coloring material of a variety of colors, which can be formulated according to practical needs.

In some embodiments of the present invention, the polyvinyl butyral composite material is a polyvinyl butyral leftover material. In some embodiments of the present invention, the polyvinyl butyral leftover material is a glass leftover material comprising a polyvinyl butyral laminate film, and the glass will be removed before use. In some embodiments of the present invention, the polyvinyl butyral leftover material is a polyvinyl butyral laminate film leftover material. Therefore, the present invention can recycle the wasted leftover materials and responds to the environmental protection demands in the contemporary world.

In some embodiments of the present invention, the modified polyvinyl butyral material is in a form of pellets. In some embodiments of the present invention, the pellets of the modified polyvinyl butyral material have a diameter of 2 millimeters (mm) to 8 mm, and a length of 3 mm to 8 mm. In some embodiments of the present invention, the pellets of the modified polyvinyl butyral material have a diameter of 5 mm, and a length of 6 mm. The size of the modified polyvinyl butyral material pellets can be determined according to practical needs.

In some embodiments of the present invention, the elements are mixed and compounded, and modified to obtain the modified polyvinyl butyral material. In some embodiments of the present invention, the elements are mixed and compounded, and then modified for several times to obtain the modified polyvinyl butyral material. In some embodiments of the present invention, the elements are mixed and compounded, and then modified for at least twice to obtain the modified polyvinyl butyral material. In some embodiments of the present invention, the temperatures of each modifying step can be the same or different.

Another purpose of the present invention is to provide a preparation method of the above-mentioned modified polyvinyl butyral material, comprising the following steps:
(1) mixing and compounding components including the polyvinyl butyral composite material, the filler, the anti-hydrolysis agent, the first plasticizer, zinc stearate, calcium stearate and the polymeric dispersant at 110° C. to 140° C. to obtain a blend;
(2) primarily modifying the blend at 150° C. to 165° C. to obtain a primarily modified product; and
(3) secondarily modifying the primarily modified product at 120° C. to 150° C. to obtain the modified polyvinyl butyral material.

In some embodiments of the present invention, after the step (3), the modified polyvinyl butyral material is produced into the modified polyvinyl butyral material pellets by the dies and cutter. In some embodiments of the present invention, the modified polyvinyl butyral material pellets have a diameter of 2 mm to 8 mm, and a length of 3 mm to 8 mm. The size of the modified polyvinyl butyral material pellets can be determined according to practical needs.

In some embodiments of the present invention, the step (1) is carried out in an internal mixer. In some embodiments of the present invention, the steps (2) and (3) are independently carried out in a pelletizer.

Another purpose of the present invention is to provide a modified polyvinyl butyral product, comprising at least one modified polyvinyl butyral layer prepared from a material comprising the above-mentioned modified polyvinyl butyral material. In some embodiments of the present invention, the modified polyvinyl butyral layer is prepared by a casting process.

In some embodiments of the present invention, the modified polyvinyl butyral product further comprises at least one base layer set on the modified polyvinyl butyral layer, and each base layer is independently selected from the group consisting of a fabric layer, a metalized plastic layer, a plastic layer, and combinations thereof.

In some embodiments of the present invention, the fabric layer can be a woven fabric or a non-woven fabric. In some embodiments of the present invention, the fabric layer can be made by a natural material (e.g. cotton, hemp, jute, linen, wool and the like), a synthetic material (e.g. a polyester material, a polyamide material and the like), or any combinational materials blending any of the above materials. In some embodiments of the present invention, the fabric made of the polyester fiber is a terylene fabric. In some embodiments of the present invention, the fabric made of the polyamide fiber is a nylon fabric. In some embodiments of the present invention, the woven fabric is a mesh fabric. In some embodiments of the present invention, the non-woven fabric is a mesh fabric.

In some embodiments of the present invention, the plastic layer can be made of a plastic commonly used in fabrics, such as polyethylene terephthalate (PET).

In some embodiments of the present invention, the metalized plastic layer can be an aluminum metalized plastic layer, such as aluminum (Al) metalized PET film. In some embodiments of the present invention, the Al metalized PET film is a PET film having one side plated with 0.02 wt % of aluminum.

In some embodiments of the present invention, the modified polyvinyl butyral product further comprises one or more adhesive layers. In some embodiments of the present invention, an adhesive layer is further independently comprised between each modified polyvinyl butyral layer and each base layer, wherein the adhesive layer is composed of an adhesive. In some embodiments of the present invention, when the amount of the adhesive is 20 grams per square meter ($g/m^2$) or more (e.g. 20 $g/m^2$ to 50 $g/m^2$), the solvent comprised in the adhesive needs to be evaporated by an oven. In some embodiments of the present invention, when the amount of the adhesive is less than 20 $g/m^2$ (e.g. 4 $g/m^2$ to 18 $g/m^2$, or 6 $g/m^2$ to 16 $g/m^2$, or 8 $g/m^2$ to 12 $g/m^2$, or 10 $g/m^2$ to 11 $g/m^2$), the solvent comprised in the adhesive does not need to be evaporated in advance because when the adhesive layer set on the base layer is in contact with the modified polyvinyl butyral material at a high temperature during or after the casting step, the solvent comprised in the adhesive layer can be removed.

In some embodiments of the present invention, the adhesive layer is independently composed of a mixture of a glue and a crosslinking agent. In some embodiments of the present invention, the glue comprises a polyurethane glue, an acrylic glue, or a combination thereof. In some embodiments of the present invention, the crosslinking agent comprises a urethane prepolymer crosslinking agent. In some embodiments of the present invention, the crosslinking agent is in an amount of 1.5 parts by weight to 9 parts by weight, or 2 parts by weight to 8 parts by weight, based on 100 parts by weight of the total weight of the glue.

In some embodiments of the present invention, the modified polyvinyl butyral layer is further embossed and/or foamed. In some embodiments of the present invention, the modified polyvinyl butyral layer to be foamed is composed of a mixture of the modified polyvinyl butyral material and a foaming agent, wherein the foaming agent is in an amount of 5 parts by weight to 7 parts by weight based on 100 parts by weight of the total weight of the polyvinyl butyral composite material. In some embodiments of the present invention, the foaming agent comprises azodicarbonamide (also known as the AC foaming agent).

Yet another purpose of the present invention is to provide a preparation method of the above-mentioned modified polyvinyl butyral product, comprising the following steps: casting the above-mentioned modified polyvinyl butyral material to form a first modified polyvinyl butyral layer. In some embodiments of the present invention, the preparation method of the modified polyvinyl butyral product further comprises the following steps: cooling and setting, and winding the resulting product.

In some embodiments of the present invention, the first modified polyvinyl butyral layer is casted on a first base layer. In some embodiments of the present invention, before casting to form the first modified polyvinyl butyral layer, the method further comprises the following step: coating an adhesive on the first base layer to form a first adhesive layer, and the first adhesive layer is located between the first modified polyvinyl butyral layer and the first base layer. In some embodiments of the present invention, the preparation method of the modified polyvinyl butyral product further comprises the following steps: cooling and setting, and winding the resulting product.

In some embodiments of the present invention, the preparation method of the modified polyvinyl butyral product further comprises the following step: casting the modified polyvinyl butyral material on the other side of the first base layer to form a second modified polyvinyl butyral layer, so as to obtain a modified polyvinyl butyral product comprising the first base layer inserted between the first modified polyvinyl butyral layer and the second modified polyvinyl butyral layer. In some embodiments of the present invention, before casting to form the second modified polyvinyl butyral layer, the method further comprises the following step: coating an adhesive on the other side of the first base layer to form a second adhesive layer, and the second adhesive layer is located between the second modified polyvinyl butyral layer and the first base layer. In some embodiments of the present invention, the preparation method of the modified polyvinyl butyral product further comprises the following steps: cooling and setting, and winding the resulting product.

In some embodiments of the present invention, the preparation method of the modified polyvinyl butyral product further comprises the following step: covering a second base layer over the first modified polyvinyl butyral layer, so as to obtain a modified polyvinyl butyral product comprising the first modified polyvinyl butyral layer inserted between the first base layer and the second base layer. In some embodiments of the present invention, the first modified polyvinyl butyral layer and the second base layer are bound by hot pressing. In some embodiments of the present invention, before covering the second base layer, the method further comprises the following step: coating an adhesive on the second base layer to form a third adhesive layer, and the third adhesive layer is located between the first modified polyvinyl butyral layer and the second base layer. In some embodiments of the present invention, the preparation method of the modified polyvinyl butyral product further comprises the following steps: cooling and setting, and winding the resulting product.

In some embodiments of the present invention, the modified polyvinyl butyral material can be repeatedly casted on the first modified polyvinyl butyral layer to form a thicker first modified polyvinyl butyral layer. In some embodiments of the present invention, the modified polyvinyl butyral material can be repeatedly casted on the second modified polyvinyl butyral layer to form a thicker second modified polyvinyl butyral layer. In some embodiments of the present invention, the casting step can be repeated to form a thicker modified polyvinyl butyral layer, and then the thicker modified polyvinyl butyral layer is subjected to the follow-up steps such as foaming, embossing, setting, winding or a combination thereof. In some embodiments of the present invention, the thickness of the modified polyvinyl butyral layer formed by every casting step is 0.05 mm to 0.5 mm, and the number of casting is determined by the cast layer thickness needed for the final product. In some embodiments of the present invention, the thickness of the modified polyvinyl butyral layer formed by every casting step is 0.05 mm to 0.5 mm, 0.1 mm to 0.3 mm, or 0.15 mm to 0.2 mm.

In some embodiments of the present invention, the preparation method of the modified polyvinyl butyral product further comprises the following steps: embossing and/or foaming the first modified polyvinyl butyral layer and/or the second modified polyvinyl butyral layer.

In some embodiments of the present invention, the materials of the first base layer and the second base layer can be the same or different. The materials of each base layer are as described herein.

In some embodiments of the present invention, the materials of the first adhesive layer, the second adhesive layer and the third adhesive layer can be the same or different. The materials of each adhesive layer are described herein.

The products comprising a PVB layer is conventionally manufactured by a calendering process, in which multiple individual equipment (such as a calender, a gluing machine, a laminator, a winder and the like) are needed, and the process is segmented into several parts. Thus, it results in higher cost and air pollution. However, a casting process is applied in the present invention, in which the gluing, casting, setting and winding steps can be arranged in a single production line and the process needs not be segmented. Since then, the equipment, manpower and energy costs can be reduced, and the space needed for the factory also can be decreased. In addition, the casting process can be operated in a closed system, which will not cause air pollution even if the plasticizer is evaporated after heating. Therefore, the casting process used in the present invention has an increased practicality because it can effectively reduce a variety of costs, energy consumption and air pollution.

From above, it is clear that the present invention provides a modified polyvinyl butyral material with good water resistance and anti-sticking property, and it produces modified polyvinyl butyral products comprising one or more modified polyvinyl butyral layers prepared from a material comprising the modified polyvinyl butyral material by casting, which not only reduces the labor, space and energy costs, but also reduces air pollution. In addition, the modified polyvinyl butyral material can be prepared from the polyvinyl butyral leftover material. The leftover material to be discarded can be reused, and this responds to the demands of environmental protection in this era.

DETAILED DESCRIPTION OF THE PREFERRED EMBODIMENTS

Examples are given below to illustrate the details of the present invention. Other objectives, advantages and novel features of the invention will become more apparent from the following detailed description when taken in conjunction with the accompanying drawings.

Preparation of Modified Polyvinyl Butyral Material of the Present Invention

Figure 1:
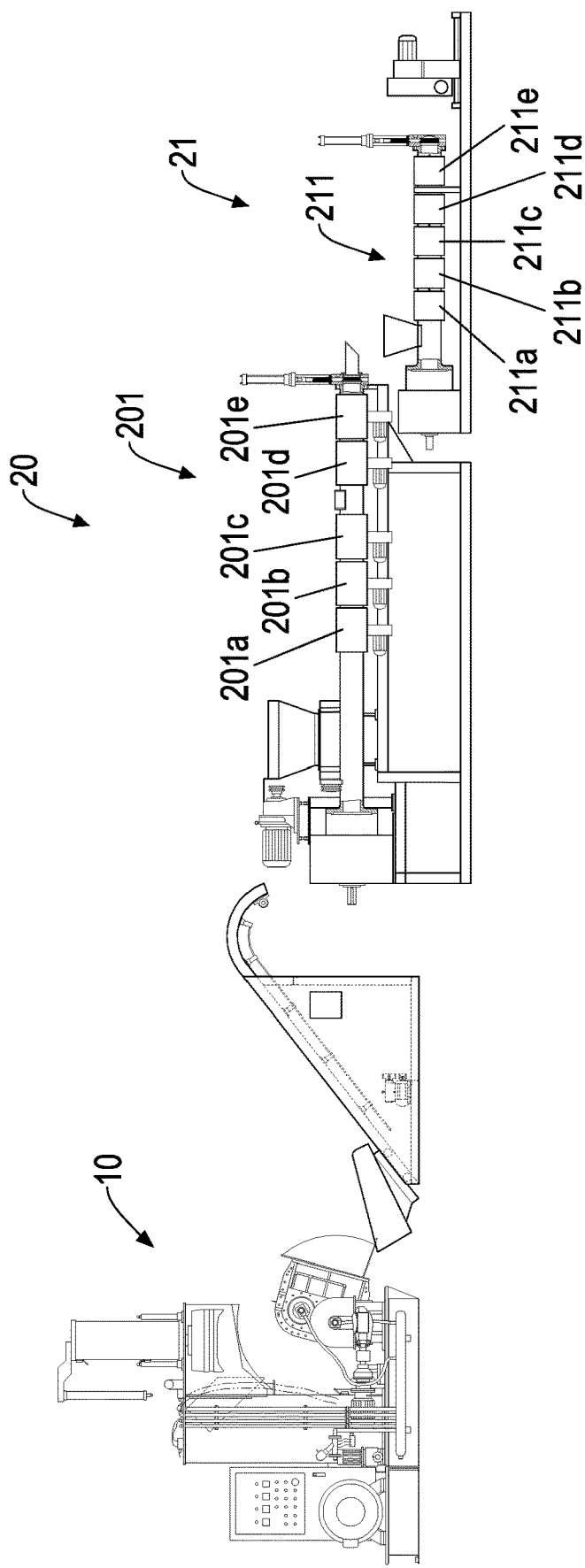
FIG. 1 is the schematic diagram of the production line of the modified polyvinyl butyral material of the present invention.

The production line of the modified polyvinyl butyral material of the present invention was shown in FIG. 1. First, the PVB leftover material including the PVB laminate film obtained from wasted glass (with the glass removed) and the PVB laminate film offcut, and the filler (calcium carbonate and kaolin powder), the anti-hydrolysis agent (carbodiimide), the first plasticizer (triethylene glycol bis(2-ethylhexanoate)), the cold-resistant agent (dioctyl adipate), the anti-oxidant (anti-oxidant 1010), zinc stearate, calcium stearate, the anti-ultraviolet agent (anti-ultraviolet agent 329), polymeric dispersant (polydimethylsilxane) and the coloring agent (inorganic coloring material) were placed in the internal mixer 10, mixed and compounded at 120° C. for 20 minutes, to make all components homogeneously blended and obtain a blend. The PVB leftover material comprised PVB and a second plasticizer, wherein the second plasticizer is in an amount of 3 parts by weight to 15 parts by weight based on 100 parts by weight of the total weight of the PVB leftover material.

TABLE 1

| Component (parts by weight) | Example 1 | Example 2 | Example 3 |
|---|---|---|---|
| PVB leftover material | 100 | 100 | 100 |
| Calcium carbonate | 100 | 6 | 150 |
| Kaolin powder | 5 | 12.5 | 8 |
| Carbodiimide | 0.5 | 2 | 1.3 |
| Triethylene glycol bis(2-ethylhexanoate) | 3 | 15 | 6 |
| Dioctyl adipate | 2 | 8 | 5 |
| Inorganic coloring material | 16 | 1 | 30 |
| Anti-oxidant 1010 | 2 | 1 | 1.5 |
| Zinc stearate | 3.6 | 2 | 2.8 |
| Calcium stearate | 1.2 | 0.2 | 0.7 |
| Anti-ultraviolet agent 329 | 0.65 | 0.3 | 1 |
| Polydimethylsiloxane | 0.005 | 0.002 | 0.007 |

The blend was then transferred into the first pelletizer 20 and primarily modified. When the blend passed through the screw 201 of the first pelletizer 20, it was heated at a temperature of 150° C. to 165° C. And it was extruded and filtered under a pressure when it passed through the zone 201a to the zone 201e of the screw 201 (for about 1 minute to 3 minutes, during which the temperatures of the zones were the same). After that, a strip-shaped primarily modified product was obtained.

The primarily modified product was then transferred into the second pelletizer 21 and secondarily modified. When the primarily modified product passed through the screw 211 of the second pelletizer 21, it was heated at a temperature of 120° C. to 155° C. And it was extruded and filtered under a pressure when it passed through the zone 211a to the zone 211e of the screw 211 (for about 1 to 3 minutes, during which the temperatures of the zones were the same). At last, the modified PVB material pellets of the present invention were obtained by the dies and cutter, in which the pellets had a diameter of 5 mm and a length of 6 mm. The modified PVB material pellets were uniform in size, and qualified for the following process for the products.

Water Resistance Test

The modified polyvinyl butyral materials of Examples 1 to 3 were casted to obtain films having a thickness of 0.2 mm, respectively, and the films were cut to give test pieces having a total weight of 100 grams (g). These test pieces were soaked in water at room temperature (25° C.) for 24 hours. After that, the water on the surface of the test pieces were wiped out, and the test pieces were weighted to calculate the amount of water absorbed therein. Similarly, the above-mentioned PVB leftover material (comprising PVB and the second plasticizer) was also made into test pieces and subjected to the water resistance test (as the Reference Example). The results were shown in Table 2.

TABLE 2

| | Example 1 | Example 2 | Example 3 | Reference Example |
|---|---|---|---|---|
| Weight of test piece after soaking in water (g) | 107 | 103 | 105 | 114 |
| Water absorbency (%) | 7% | 3% | 5% | 14% |

From Table 2, it was clear that the modified polyvinyl butyral materials of Examples 1 to 3 had a much lower water absorbency than the Reference Example. In other words, Examples 1 to 3 had a better water resistance. In addition, the test pieces of Reference Example were whitened, which was disadvantageous to the follow-up preparation of the polyvinyl butyral products.

Anti-Sticking Test

The modified polyvinyl butyral materials of Examples 1 to 3 were casted to obtain films having a thickness of 0.2 mm, respectively, and the films were cut to give test pieces having a size of 50 mm×100 mm. Two test pieces were overlapped, evenly pressed with a force of 3 kg thereon, and heated in an oven at 70° C. for 120 hours. Similarly, the above-mentioned PVB leftover material (comprising PVB and the second plasticizer) was also made into test pieces and subjected to the anti-sticking test (as the Reference Example). It was found that the test pieces made of the modified polyvinyl butyral materials of Examples 1 to 3 did not stick to each other after the aforesaid treatment, but the test pieces of the Reference Example stuck to each other. Therefore, the modified polyvinyl butyral materials of Examples 1 to 3 had a better anti-sticking property than the Reference Example.

PREPARATION OF MODIFIED PVB PRODUCTS OF THE PRESENT INVENTION

Preparation Example 1: Single-Sided Fabric Comprising a Modified PVB Cast Layer

Figure 2:
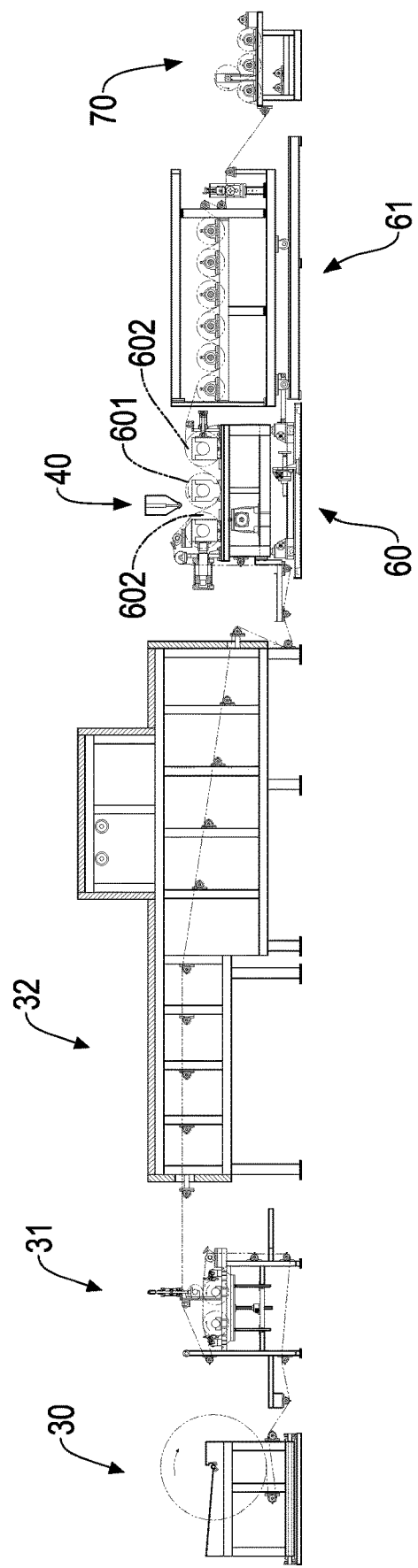
FIG. 2 is the schematic diagram of the production line used in the Preparation Examples 1, 2, 7 and 8 of the present invention.

First, as shown in FIG. 2, a fabric (woven or non-woven) was sent by the first sending machine 30, and transferred to the first gluing machine 31. In the first gluing machine 31, an adhesive was coated on one side of the fabric, and the adhesive-coated fabric was transferred to the oven 32 and heated at a temperature of 100° C. to 130° C., to evaporate the solvent in the adhesive.

Figure 3:
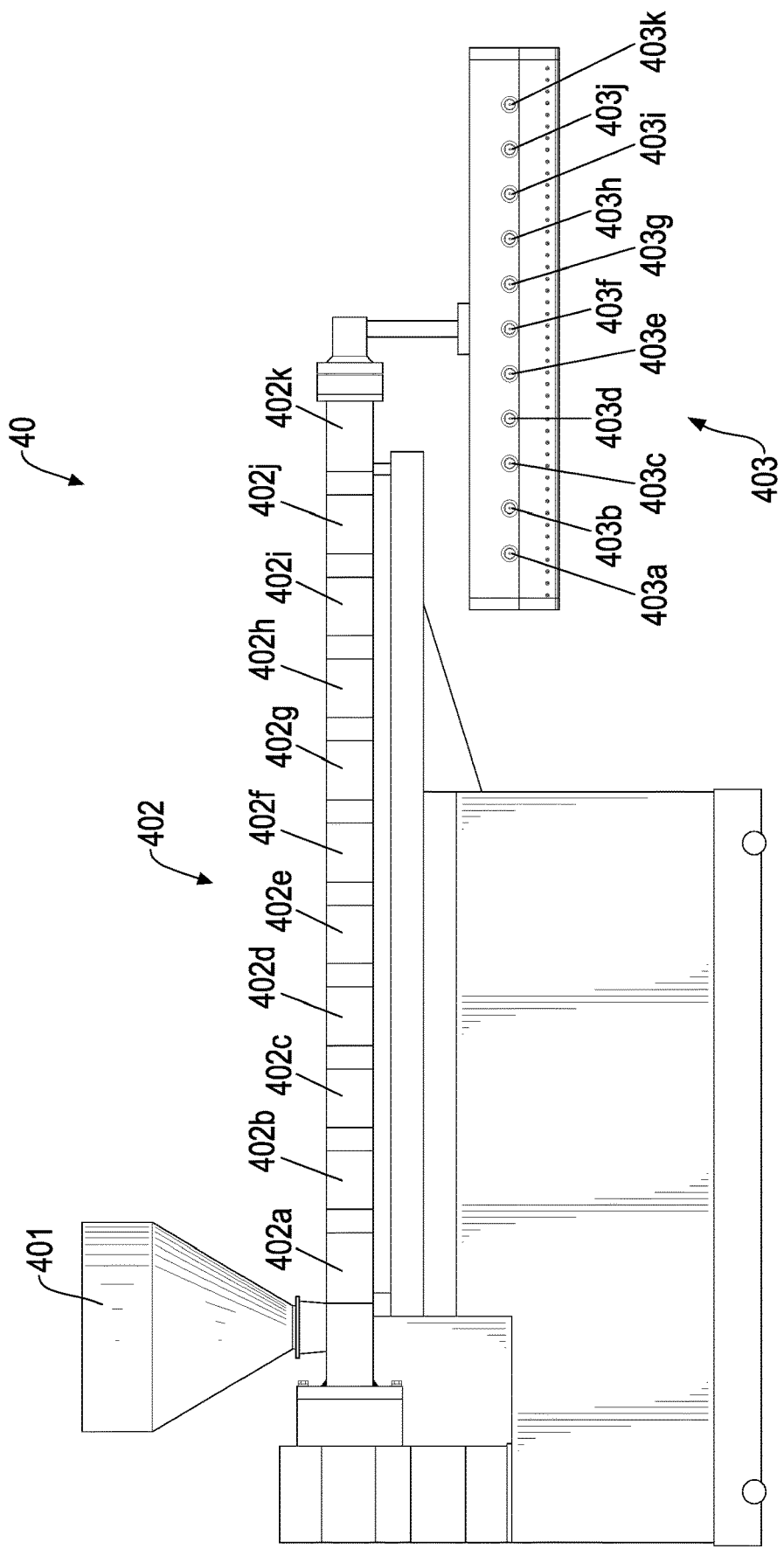
FIG. 3 is the schematic diagram of the casting machine used in Preparation Examples of the present invention.

The above-mentioned modified PVB material pellets were loaded into the feed hopper 401 of the casting machine 40. The directions of the casting machine 40 shown in FIG. 2 and FIG. 3 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the adhesive-coated side of the fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 4:
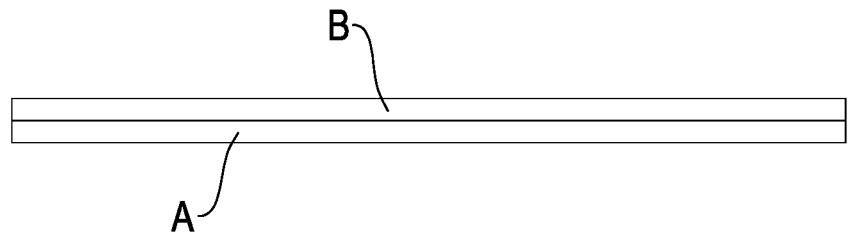
FIG. 4 is the cross-sectional view of the single-sided fabric comprising a modified PVB cast layer of the present invention.

The fabric casted with a layer of the modified PVB material was transferred to the first embossing machine 60 for embossing treatment; and then transferred to the first setting machine 61 for cooling and setting, to give a single-sided fabric comprising a modified PVB cast layer. The single-sided fabric comprising a modified PVB cast layer was wound by the first winder 70. The cross-sectional view of the single-sided fabric comprising a modified PVB cast layer was shown in FIG. 4, in which A indicated the fabric layer, and B indicated the modified PVB layer.

In addition, when a thicker modified PVB cast layer was needed to be formed on the side of the fabric, the casting step could be simply repeated on the same side.

Figure 5:
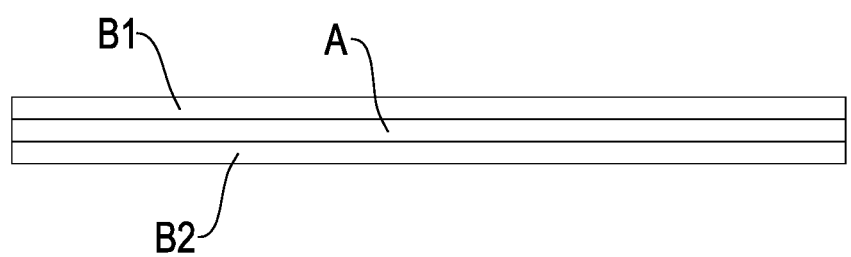
FIG. 5 is the cross-sectional view of the double-sided fabric comprising two modified PVB cast layers of the present invention.

Preparation Example 2: Double-Sided Fabric Comprising Two Modified PVB Cast Layers In addition, the modified PVB material could be casted on the other side (not coated with the adhesive yet) of the single-sided fabric comprising a modified PVB cast layer obtained in Preparation Example 1 to form another modified PVB cast layer in accordance with the steps described in Preparation Example 1, to give a double-sided fabric comprising two modified PVB cast layers. The cross-sectional view of the double-sided fabric comprising two modified PVB cast layers was shown in FIG. 5, in which A indicated the fabric layer, B1 indicated the first modified PVB layer, and B2 indicated the second modified PVB layer.

Similarly, when a thicker modified PVB cast layer was needed to be formed on either side of the fabric, the casting step could be simply repeated on the desired side.

Preparation Example 3: Fabric Comprising an Inserted Modified PVB Cast Layer

Figure 6:
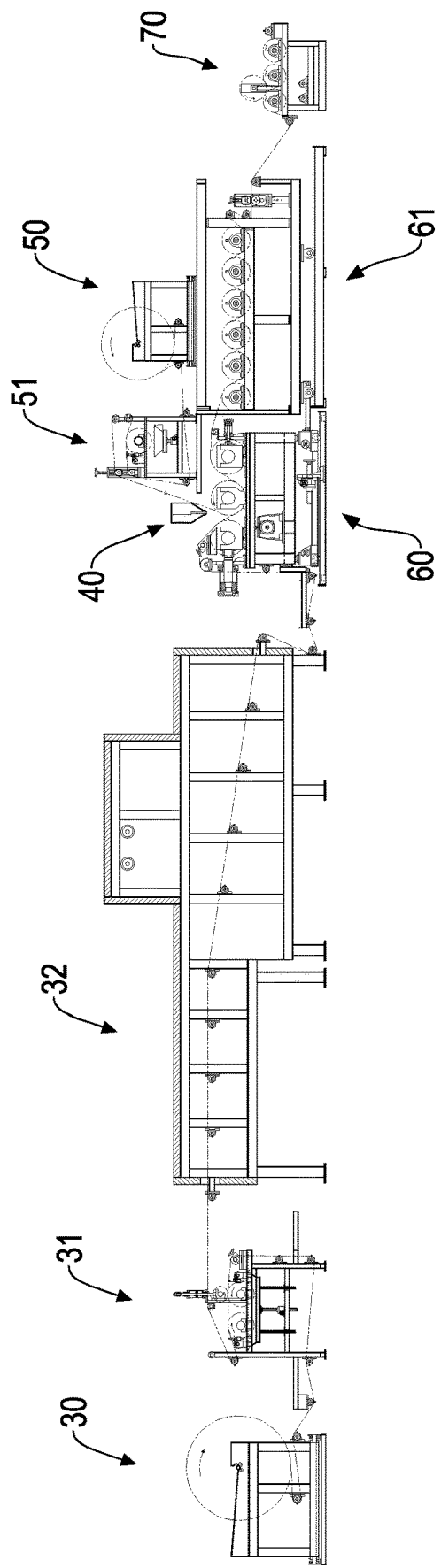
FIG. 6 is the schematic diagram of the production line used in the Preparation Examples 3, 5 and 6 of the present invention.

As shown in FIG. 6, two fabrics (woven or non-woven) were sent by the first sending machine 30 and the second sending machine 50, respectively.

The first fabric sent by the first sending machine 30 was transferred to the first gluing machine 31, and an adhesive was coated on one side of the first fabric. The adhesive-coated first fabric was transferred to the oven 32 and heated at a temperature of 100° C. to 130° C., to evaporate the solvent in the adhesive.

The above-mentioned modified PVB material pellets were loaded into the feed hopper 401 of the casting machine 40. The directions of the casting machine 40 shown in FIG. 3 and FIG. 6 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the adhesive-coated side of the first fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 7:
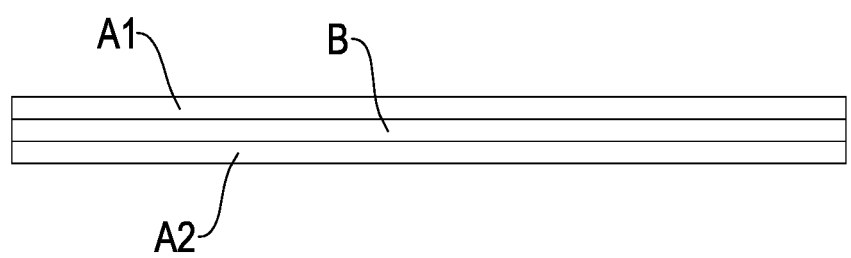
FIG. 7 is the cross-sectional view of the fabric comprising an inserted modified PVB cast layer of the present invention.

In addition, the second fabric sent by the second sending machine 50 was transferred to the second gluing machine 51, and an adhesive was coated on one side of the second fabric, in which the amount of the adhesive was less than 20 g/m². After that, the modified PVB layer casted on the first fabric was bound to the adhesive-coated side of the second fabric, and transferred to the first embossing machine 60 and pressed for binding by a flat roll with a force of 12 kilograms (kg). After the second fabric was bound to the modified PVB cast layer on the first fabric, a product having the modified PVB cast layer inserted between the first fabric and the second fabric was obtained. The product was transferred to the first setting machine 61 for cooling and setting, to give a fabric comprising an inserted modified PVB cast layer. The fabric comprising an inserted modified PVB cast layer was wound by the first winder 70. The cross-sectional view of the fabric comprising an inserted modified PVB cast layer was shown in FIG. 7, in which A1 indicated the first fabric layer, A2 indicated the second fabric layer, and B indicated the modified PVB layer.

Figure 8:
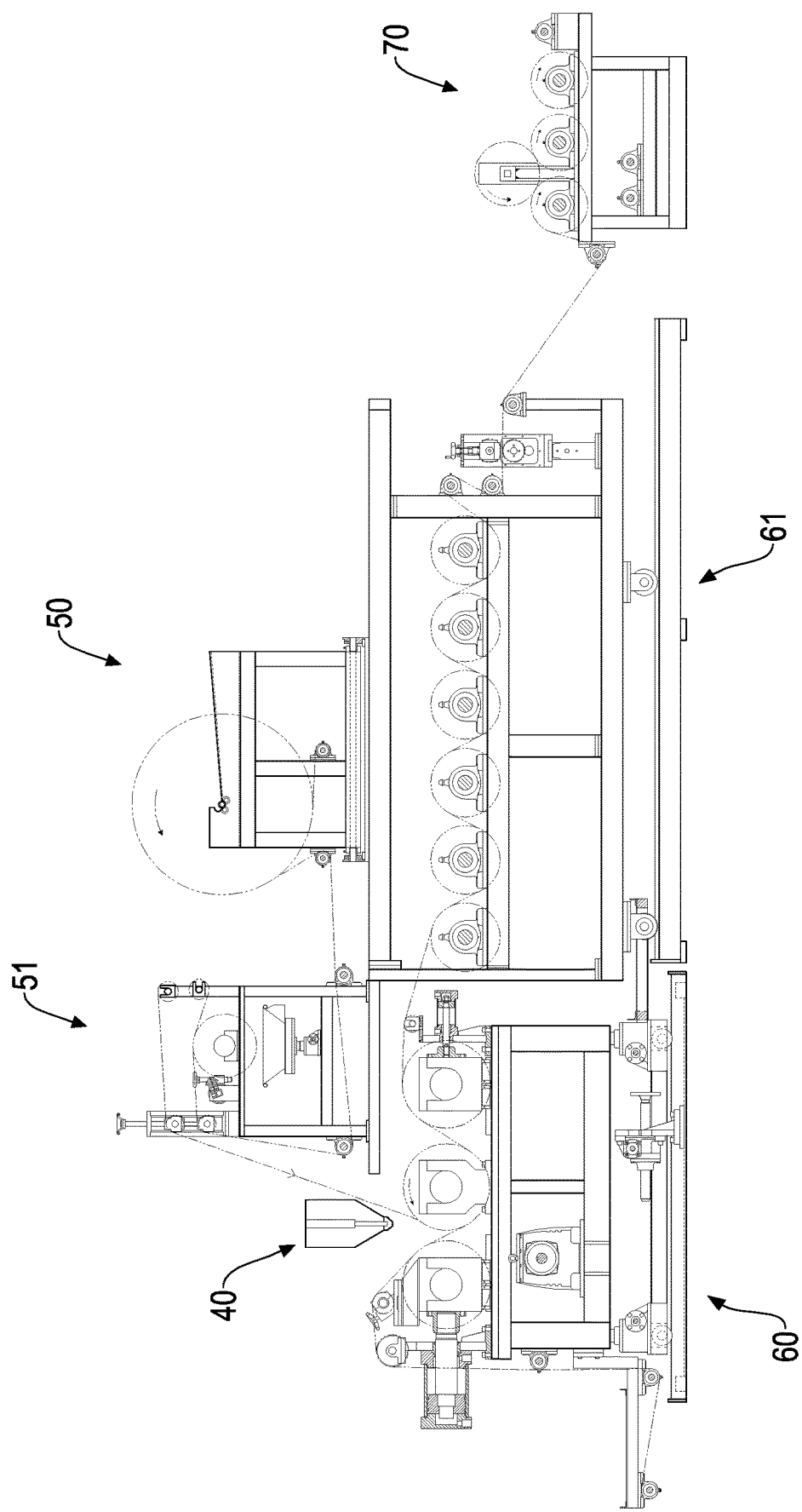
FIG. 8 is the schematic diagram of the production line used in the Preparation Example 4 of the present invention.

Preparation Example 4: Single-Sided Al Metalized PET Film Comprising a Modified PVB Cast Layer As shown in FIG. 8, first, the Al metalized PET film was sent by the second sending machine 50, and transferred to the second gluing machine 51. In the second gluing machine 51, an adhesive was coated on the Al-plated side of the Al metalized PET film, in which the amount of the adhesive was less than 20 g/m².

The above-mentioned modified PVB material pellets were loaded into the feed hopper 401 of the casting machine 40. The directions of the casting machine 40 shown in FIG. 3 and FIG. 8 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the adhesive-coated side of the Al metalized PET film. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 9:
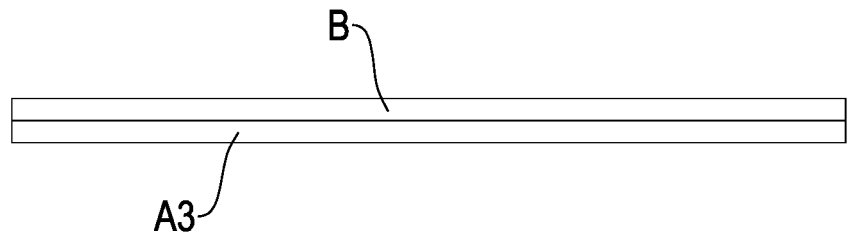
FIG. 9 is the cross-sectional view of the single-sided Al metalized PET film comprising a modified PVB cast layer of the present invention.

The Al metalized PET film casted with a layer of the modified PVB material was transferred to the first embossing machine 60 for embossing treatment; and then transferred to the first setting machine 61 for cooling and setting, to give a single-sided Al metalized PET film comprising a modified PVB cast layer. The single-sided Al metalized PET film comprising a modified PVB cast layer was wound by the first winder 70. The cross-sectional view of the single-sided Al metalized PET film comprising a modified PVB cast layer was shown in FIG. 9, in which A3 indicated the Al metalized PET layer, and B indicated the modified PVB layer.

Similarly, when a thicker modified PVB cast layer was needed to be formed on the side of the Al metalized PET film, the casting step could be simply repeated on the same side. In addition, as described in Preparation Example 2, the modified PVB material could be casted on the other side of the single-sided Al metalized PET film comprising a modified PVB cast layer, to give a double-sided Al metalized PET film comprising two modified PVB cast layers (not shown in figures).

Preparation Example 5: Artificial Leather with an Inserted Mesh Fabric

Casting on Reverse Side

As shown in FIG. 6, first, a mesh fabric was sent by the second sending machine 50 which had a shorter sending distance, and transferred to the second gluing machine 51. In the second gluing machine 51, an adhesive was coated on one side of the mesh fabric, in which the amount of the adhesive was less than 20 g/m². The sending distance between the second sending machine 50 and the second gluing machine 51 was shorter, and this was advantageous for keeping the mesh structure of the mesh fabric at the beginning of the preparation.

The above-mentioned modified PVB material pellets were loaded into the feed hopper 401 of the casting machine 40. The directions of the casting machine 40 shown in FIG. 3 and FIG. 6 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the adhesive-coated side of the mesh fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The mesh fabric casted with a layer of the modified PVB material was transferred to the first embossing machine 60 for embossing treatment; and then transferred to the first setting machine 61 for cooling and setting, to give a single-sided mesh fabric comprising a modified PVB cast layer. The single-sided mesh fabric comprising a modified PVB cast layer was wound by the first winder 70.

Casting on Front Side

Next, as shown in FIG. 6, the single-sided mesh fabric comprising a modified PVB cast layer was sent by the first sending machine 30, and transferred to the first gluing machine 31. In the first gluing machine 31, an adhesive was coated on the other side (not casted with the modified PVB layer yet) of the single-sided mesh fabric comprising a modified PVB cast layer, and the single-sided mesh fabric with an adhesive coating on the other side was transferred to the oven 32 and heated at a temperature of 100° C. to 130° C., to evaporate the solvent in the adhesive.

The above-mentioned modified PVB material pellets were loaded into the feed hopper 401 of the casting machine 40. The directions of the casting machine 40 shown in FIG. 3 and FIG. 6 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the other adhesive-coated side of the single-sided mesh fabric comprising a cast layer. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 10:
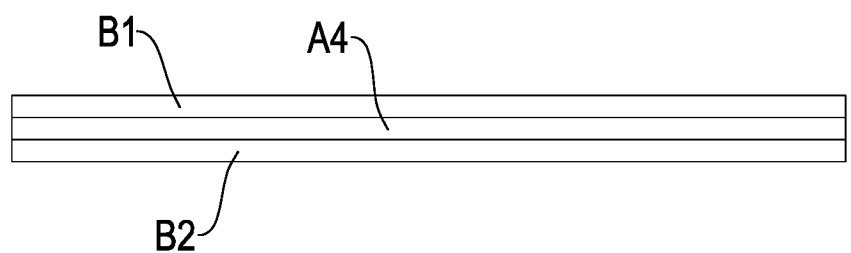
FIG. 10 is the cross-sectional view of the artificial leather with an inserted mesh fabric of the present invention.

The mesh fabric casted with two layers of the modified PVB material was transferred to the first embossing machine 60 for embossing treatment; and then transferred to the first setting machine 61 for cooling and setting, to give an artificial leather with an inserted mesh fabric. The artificial leather with an inserted mesh fabric was wound by the first winder 70. The cross-sectional view of the artificial leather with an inserted mesh fabric was shown in FIG. 10, in which A4 indicated the mesh fabric layer, B1 indicated the first modified PVB layer, and B2 indicated the second modified PVB layer.

In addition, when a thicker modified PVB cast layer was needed to be formed on the front side or the reverse side of the mesh fabric, the casting step could be simply repeated on the desired side.

Preparation Example 6: Foamed Artificial Leather

Single Side Casting

As shown in FIG. 6, a fabric (woven or non-woven) was sent by the first sending machine 30, and the fabric sent by the first sending machine was transferred to the first gluing machine 31. In the first gluing machine 31, an adhesive was coated on one side of the fabric. The adhesive-coated fabric was transferred to the oven 32 and heated at a temperature of 100° C. to 130° C., to evaporate the solvent in the adhesive.

The above-mentioned modified PVB material pellets were mixed with AC foaming agent pellets at a weight ratio of 100: 5-7, and loaded into the feed hopper 401 of the casting machine 40. The directions of the casting machine 40 shown in FIG. 3 and FIG. 6 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted on the side of the adhesive-coated fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones.

The numbers of the zones of the screw 402 and the die 403 could be 8 to 30 in general, but not limited thereto.

The fabric casted with a layer of the mixture of the modified PVB material and the AC foaming agent was transferred to the first setting machine 61 for cooling and setting, to give a single-sided fabric comprising a modified PVB-AC mixture cast layer. The single-sided fabric comprising a modified PVB-AC mixture cast layer was wound by the first winder 70.

In addition, when a thicker modified PVB cast layer was needed to be formed on the side of the fabric, the casting step could be simply repeated on the same side.

Foaming

The single-sided fabric comprising a modified PVB-AC mixture cast layer was foamed to obtain a single-sided fabric comprising a foamed modified PVB cast layer. The foaming temperature was 160° C. to 250° C., and the foaming time is 1.5 minutes to 2 minutes.

Figure 11:
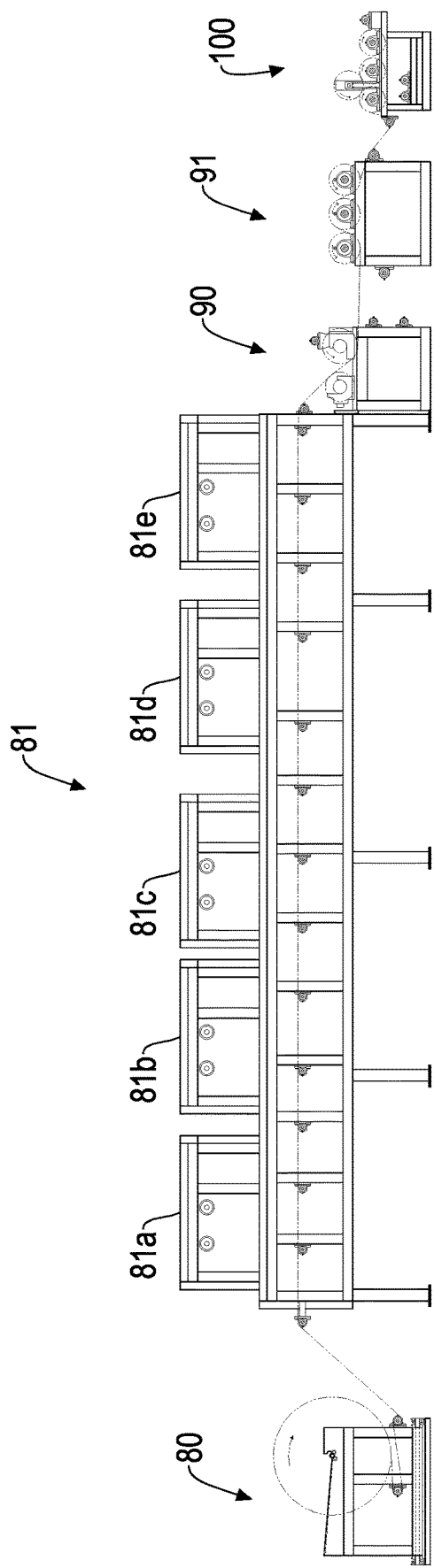
FIG. 11 is the schematic diagram of the production line used in the Preparation Examples 6 and 7 of the present invention.
Figure 12:
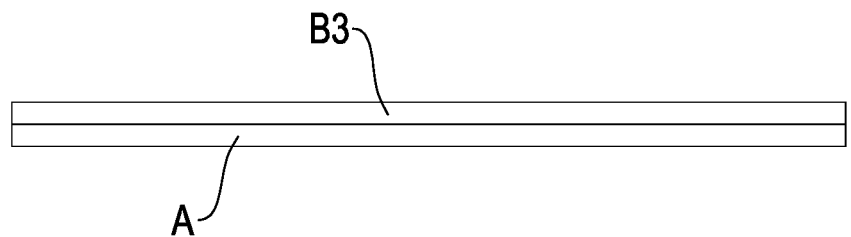
FIG. 12 is the cross-sectional view of the foamed artificial leather of the present invention.

As shown in FIG. 11, the single-sided fabric comprising a modified PVB-AC mixture cast layer was sent by the third sending machine 80, and transferred to the foaming machine 81. In the foaming machine 81, the single-sided fabric comprising a modified PVB-AC mixture cast layer was heated in the zones 81a to 81e of the foaming machine 81, in which the temperature of the zone 81e reached 160° C. to 250° C., and the temperatures of each zone could be different. The single-sided fabric comprising a modified PVB-AC mixture cast layer after the foaming heat treatment was transferred to the second embossing machine 90 refluxed with cold water at 10° C. for embossment; and then transferred to the second setting machine 91 for cooling and setting, to give a foamed artificial leather. The foamed artificial leather was wound by the second winder 100. The cross-sectional view of the foamed artificial leather was shown in FIG. 12, in which A indicated the fabric layer, and B3 indicated the foamed modified PVB layer.

Preparation Example 7: Foamed Single Film

Single Layer Casting

First, as shown in FIG. 2, the above-mentioned modified PVB material pellets were mixed with AC foaming agent pellets at a weight ratio of 100:5-7, and loaded into the feed hopper 401 of the casting machine 40. The directions of the casting machine 40 shown in FIG. 2 and FIG. 3 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted and sent into the space between the embossing roller 601 and the rubber roller 602 of the first embossing machine 60. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The cast layer of the modified PVB material was transferred to the first setting machine 61 for cooling and setting, to give a modified PVB cast film. The modified PVB cast film was wound by the first winder 70.

Foaming

The modified PVB cast film was foamed to obtain a foamed single film. The foaming temperature was 160° C. to 250° C., and the foaming time is 1.5 minutes to 2 minutes.

Figure 13:
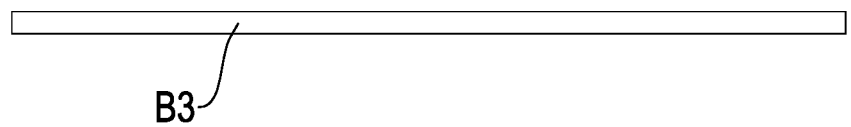
FIG. 13 is the cross-sectional view of the foamed single film of the present invention.
Figure 14:
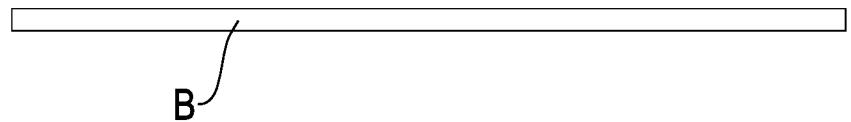
FIG. 14 is the cross-sectional view of the modified PVB film of the present invention.

As shown in FIG. 11, the modified PVB cast film was sent by the third sending machine 80 and transferred to the foaming machine 81. In the foaming machine 81, the modified PVB cast film was heated in the zones 81a to 81e of the foaming machine 81, in which the temperature of the zone 81e reached 160° C. to 250° C., and the temperatures of each zone could be different. The modified PVB cast film after the foaming heat treatment was transferred to the second embossing machine 90 refluxed with cold water at 10° C. for embossment; and then transferred to the second setting machine 91 for cooling and setting, to give a foamed single film. The foamed single film was wound by the second winder 100. The cross-sectional view of the foamed single film was shown in FIG. 13, in which B indicated the foamed modified PVB layer.

Preparation Example 8: Modified PVB Film

First, as shown in FIG. 2, the above-mentioned modified PVB material pellets were loaded into the feed hopper 401 of the casting machine 40. The directions of the casting machine 40 shown in FIG. 2 and FIG. 3 were different, and the structure of the casting machine 40 was as shown in FIG. 3. The modified PVB material pellets were molten after they passed through the zones 402a to 402k of the screw 402, and the molten modified PVB material passed through the zones 403a to 403k of the die 403 was casted and sent into the space between the embossing roller 601 and the rubber roller 602 of the first embossing machine 60. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The cast layer of the modified PVB material was transferred to the first embossing machine 60 for embossing treatment; and then transferred to the first setting machine 61 for cooling and setting, to give a modified PVB film. The modified PVB film was wound by the first winder 70. The cross-sectional view of the modified PVB film was shown in FIG. 15, in which B indicated the modified PVB layer.

Peeling Test (1) Preparation of PVB Products

First of all, the PVB products were prepared by the preparation process described in Preparation Examples 1, 4 and 5 using the modified PVB material of Example 1 (as the Testing Groups). Similarly, PVB products were prepared by the preparation process described in Preparation Examples 1, 4 and 5 using the un-modified PVB leftover material instead of the modified PVB material (as the Control Groups). However, since the un-modified PVB leftover material was incapable of casting by the casting steps, the temperature was adjusted correspondingly to ensure that the products of the Control Groups could be produced.

In the following test, a synthetic fabric (in 600D×300D, 64T) was used as the base layer (i.e., the fabric) in Preparation Example 1; an Al metalized PET film comprising 0.02 wt % of aluminum and having a thickness of 0.08 mm was used as the base layer (i.e., the Al metalized PET film) in Preparation Example 4; and a synthetic woven mesh fabric (in 250D×250D, 21T*19T) was used as the base layer (i.e., the fabric) in Preparation Example 5. The adhesive used in Preparation Examples 1, 4 and 5 was polyurethane glue. In addition, the temperatures of the screw 402 and the die 403 of the casting machine 40 were listed in the following Table 3.

(2) Peeling Test of PVB Product Specimens

At least three specimens of each PVB product (including the Testing Groups and the Control Groups of Preparation Examples 1, 4 and 5) in cross direction (CD) and in machine direction (MD) were prepared, with a specimen size of 130 mm×30 mm. The PVB cast layer (the layer made of the modified PVB material in Testing Groups or the un-modified PVB leftover material in Control Groups) and the base layer of the specimens were split from one end of the long side of the specimens for a length of 25 mm.

The peel strength was tested by HD-A604S Peel Testing Machine (in compliance with the test standard GB/T16491). During the test, the temperature was 23±2° C., the relative humidity was 60±5%, and the distance between the two clamps was 25 mm. The split parts of each specimen were separated, the PVB cast layer was connected to the upper clamp, the base layer was connected to the lower clamp, and the un-split end of the specimen was aligned with the median line between the two clamps to balance the applied forces. After that, the clamps were pulled outward at a testing speed of 100 millimeters per minute (mm/min), and the test ended after the PVB cast layer and the base layer of the specimen were completely separated. The value of peel strength in cross direction (CD) or in machine direction (MD) were the average value obtained from three specimens. The results were shown in Table 3.

TABLE 3

| | | Preparation Example 1 | | Preparation Example 4 | | Preparation Example 5 (front side) | | Preparation Example 5 (reverse side) | |
|---|---|---|---|---|---|---|---|---|---|
| | | Base layer | | | | | | | |
| | | Synthetic fabric | | Al metalized PET film | | Synthetic mesh fabric | | Synthetic mesh fabric | |
| | | Amount of adhesive (g/m$^2$) | | | | | | | |
| | | 11 | | 11 | | 16 | | 16 | |
| | | Cast layer | | | | | | | |
| | | Un-modified PVB leftover material (Control Group) | Modified PVB material (Testing Group) | Un-modified PVB leftover material (Control Group) | Modified PVB material (Testing Group) | Un-modified PVB leftover material (Control Group) | Modified PVB material (Testing Group) | Un-modified PVB leftover material (Control Group) | Modified PVB material (Testing Group) |
| Temp. of each zone of the screw (° C.) | Zone 402a | 135 | 135 | 135 | 138 | 135 | 135 | 135 | 135 |
| | Zone 402b | 135 | 135 | 135 | 138 | 135 | 135 | 135 | 135 |
| | Zone 402c | 140 | 145 | 140 | 146 | 140 | 140 | 140 | 140 |
| | Zone 402d | 140 | 145 | 140 | 146 | 140 | 140 | 140 | 140 |
| | Zone 402e | 145 | 148 | 145 | 150 | 145 | 145 | 145 | 145 |
| | Zone 402f | 146 | 148 | 146 | 150 | 146 | 145 | 146 | 145 |
| | Zone 402g | 146 | 148 | 146 | 155 | 146 | 148 | 146 | 148 |
| | Zone 402h | 150 | 153 | 150 | 160 | 150 | 148 | 150 | 148 |
| | Zone 402i | 155 | 153 | 155 | 165 | 155 | 160 | 155 | 160 |
| | Zone 402j | 155 | 164 | 155 | 165 | 155 | 160 | 155 | 160 |
| | Zone 402k | 155 | 164 | 155 | 165 | 155 | 160 | 155 | 160 |
| Temp. of each zone of the die (° C.) | | 165 | 175 | 165 | 170 | 165 | 168 | 165 | 168 |
| PVB cast layer thickness (mm) | | 0.2 | 0.2 | 0.15 | 0.15 | 0.18 | 0.18 | 0.12 | 0.12 |
| Peel strength in CD (kgf) | | 0~0.3 | 1.0~1.8 | 0~0.3 | 1.0~1.5 | 0~0.3 | 1.8~2.0 | 0~0.3 | 2.0~3.0 |
| Peel strength in MD (kgf) | | 0~0.5 | 1.5~2.0 | 0~0.5 | 1.5~2.0 | 0~0.5 | 2.0~3.0 | 0~0.5 | 2.5~3.5 |

From Table 3, it was clear that the Testing Groups using the modified polyvinyl butyral material of Example 1 had higher peel strength in CD and peel strength in MD between the cast layer and the base layer than those of the Control Groups using the un-modified PVB leftover material. When the cast layer made of the un-modified PVB leftover material was applied for a product, the cast layer could be peeled off easily. However, the modified polyvinyl butyral material of the present invention significantly increased the peel strength, and made the cast layer not easily peeled off, so it can be advantageous to be applied in PVB products.

In addition, if a foaming step was added in the preparation process, the temperatures of the zones 81a to 81e of the foaming machine 81 were gradually increasing, such as in the sequence of 150° C., 155° C., 160° C., 175° C. and 180° C., which could be adjusted according to the amount of the foaming agent. The peel strength of the foamed PVB cast layer was increased by 0.2 kilograms force (kgf) to 0.4 kgf.

In summary, the modified polyvinyl butyral material of the present invention has better water resistance and anti-sticking property. And the modified polyvinyl butyral products prepared by casting the modified polyvinyl butyral material can be used to produce outdoor products and daily necessities, such as dust covers, tents, raincoats, luggage, handbags, household goods, sporting goods, light box clothing, banners, floor mats and the like. In addition, other materials such as polyvinyl butyral and plasticizers can be added into the modified polyvinyl butyral material of the present invention to produce the laminating films for glass.

The above examples are used to illustrate the present invention, not intended to limit the claims of the present invention. The scope of the present invention is defined by the appended claims, not limited by embodiments described in the specification.

What is claimed is:

1. A method for preparing a modified polyvinyl butyral material, comprising the following steps:
   (1) mixing and compounding components including a polyvinyl butyral composite material, a filler, an anti-hydrolysis agent, a first plasticizer, zinc stearate, calcium stearate and a polymeric dispersant at 110° C. to 140° C. to obtain a blend;
   (2) primarily modifying the blend at 150° C. to 165° C. to obtain a primarily modified product; and
   (3) secondarily modifying the primarily modified product at 120° C. to 150° C. to obtain the modified polyvinyl butyral material;
   wherein the polyvinyl butyral composite material is obtained by plasticizing a composition comprising polyvinyl butyral and a second plasticizer; wherein the filler is a combination of calcium carbonate and a crystalline aluminosilicate; wherein calcium carbonate is in an amount of 5 parts by weight to 160 parts by weight, the crystalline aluminosilicate is in an amount of 3 parts by weight to 15 parts by weight, the anti-hydrolysis agent is in an amount of 0.3 parts by weight to 2.5 parts by weight, the first plasticizer is in an amount of 2.5 parts by weight to 20 parts by weight, zinc stearate is in an amount of 1.5 parts by weight to 5 parts by weight, calcium stearate is in an amount of 0.1 parts by weight to 1.5 parts by weight, the polymeric dispersant is in an amount of 0.001 parts by weight to 0.010 parts by weight, and the second plasticizer is in an amount of 3 parts by weight to 15 parts by weight, based on 100 parts by weight of the total weight of the polyvinyl butyral composite material.

2. The method as claimed in claim 1, wherein the anti-hydrolysis agent comprises a carbodiimide type anti-hydrolysis agent.

3. The method as claimed in claim 1, wherein the first plasticizer and the second plasticizer independently comprise a bis(2-ethylhexanoate) type plasticizer, a phthalate type plasticizer, an adipate type plasticizer, or a combination thereof.

4. The method as claimed in claim 1, wherein the polymeric dispersant comprises a polysiloxane, a high melting-point wax, or a combination thereof.

5. The method as claimed in claim 1, wherein the polyvinyl butyral composite material is a polyvinyl butyral leftover material.

6. The method as claimed in claim 1, wherein the components further comprise a cold-resistant agent in an amount of 1.5 parts by weight to 10 parts by weight based on 100 parts by weight of the total weight of the polyvinyl butyral composite material, wherein the cold-resistant agent comprises an adipate type cold-resistant agent.

7. The method as claimed in claim 1, wherein the components further comprise an anti-oxidant in an amount of 0.5 parts by weight to 2.5 parts by weight based on 100 parts by weight of the total weight of the polyvinyl butyral composite material, wherein the anti-oxidant comprises a pentaerythritol ester type anti-oxidant, a phosphite type anti-oxidant, a hexamethylenediamine type anti-oxidant, or a combination thereof.

8. The method as claimed in claim 1, wherein the components further comprise an anti-ultraviolet agent in an amount of 0.1 parts by weight to 1.5 parts by weight based on 100 parts by weight of the total weight of the polyvinyl butyral composite material, wherein the anti-ultraviolet agent comprises a benzotriazole type anti-ultraviolet agent, a benzophenone type anti-ultraviolet agent, or a combination thereof.

9. The method as claimed in claim 1, wherein the components further comprise a coloring agent in an amount of 0.5 parts by weight to 35 parts by weight based on 100 parts by weight of the total weight of the polyvinyl butyral composite material, wherein the coloring agent comprises an inorganic coloring agent.

10. The method as claimed in claim 1, further comprising a step: producing the modified polyvinyl butyral material into the modified polyvinyl butyral material pellets by the dies and cutter.

11. A preparation method of a modified polyvinyl butyral product comprising a modified polyvinyl butyral layer, comprising the following step: casting the modified polyvinyl butyral material produced by the method as claimed in claim 1 to form a modified polyvinyl butyral layer.

12. The preparation method as claimed in claim 11, further comprising mixing the modified polyvinyl butyral material and a foaming agent before the casting step; and foaming the modified polyvinyl butyral layer after the casting step.

13. The preparation method as claimed in claim 12, wherein the foaming agent is azodicarbonamide in an amount of 5 parts by weight to 7 parts by weight based on 100 parts by weight of the total weight of the polyvinyl butyral composite material.

14. The preparation method as claimed in claim 11, wherein the modified polyvinyl butyral product further comprises a base layer, and the modified polyvinyl butyral layer is casted on the base layer, and the base layer is selected from the group consisting of a fabric layer, a metalized plastic layer, a plastic layer, and combinations thereof.

15. The preparation method as claimed in claim 14, further comprising coating an adhesive on the base layer to form an adhesive layer before the casting step, the adhesive layer is located between the modified polyvinyl butyral layer and the base layer, the adhesive layer is composed of a mixture of a glue and a crosslinking agent, and the glue is selected from the group consisting of polyurethane glues, acrylic glues, and combinations thereof.

16. The preparation method as claimed in claim 11, wherein the modified polyvinyl butyral product further comprises a base layer, and the preparation method further comprises covering the base layer over the modified polyvinyl butyral layer, and the base layer is selected from the group consisting of a fabric layer, a metalized plastic layer, a plastic layer, and combinations thereof.

17. The preparation method as claimed in claim 16, further comprising coating an adhesive on the base layer to form an adhesive layer before the covering step, wherein the adhesive layer is located between the modified polyvinyl butyral layer and the base layer, the adhesive layer is composed of a mixture of a glue and a crosslinking agent, and the glue is selected from the group consisting of polyurethane glues, acrylic glues, and combinations thereof.

18. The preparation method as claimed in claim 11, further comprising embossing the modified polyvinyl butyral layer.

* * * * *